Sept. 30, 1941.   A. A. HERRICK ET AL   2,257,256
FLUTE GRINDING APPARATUS
Filed May 28, 1938   9 Sheets-Sheet 2

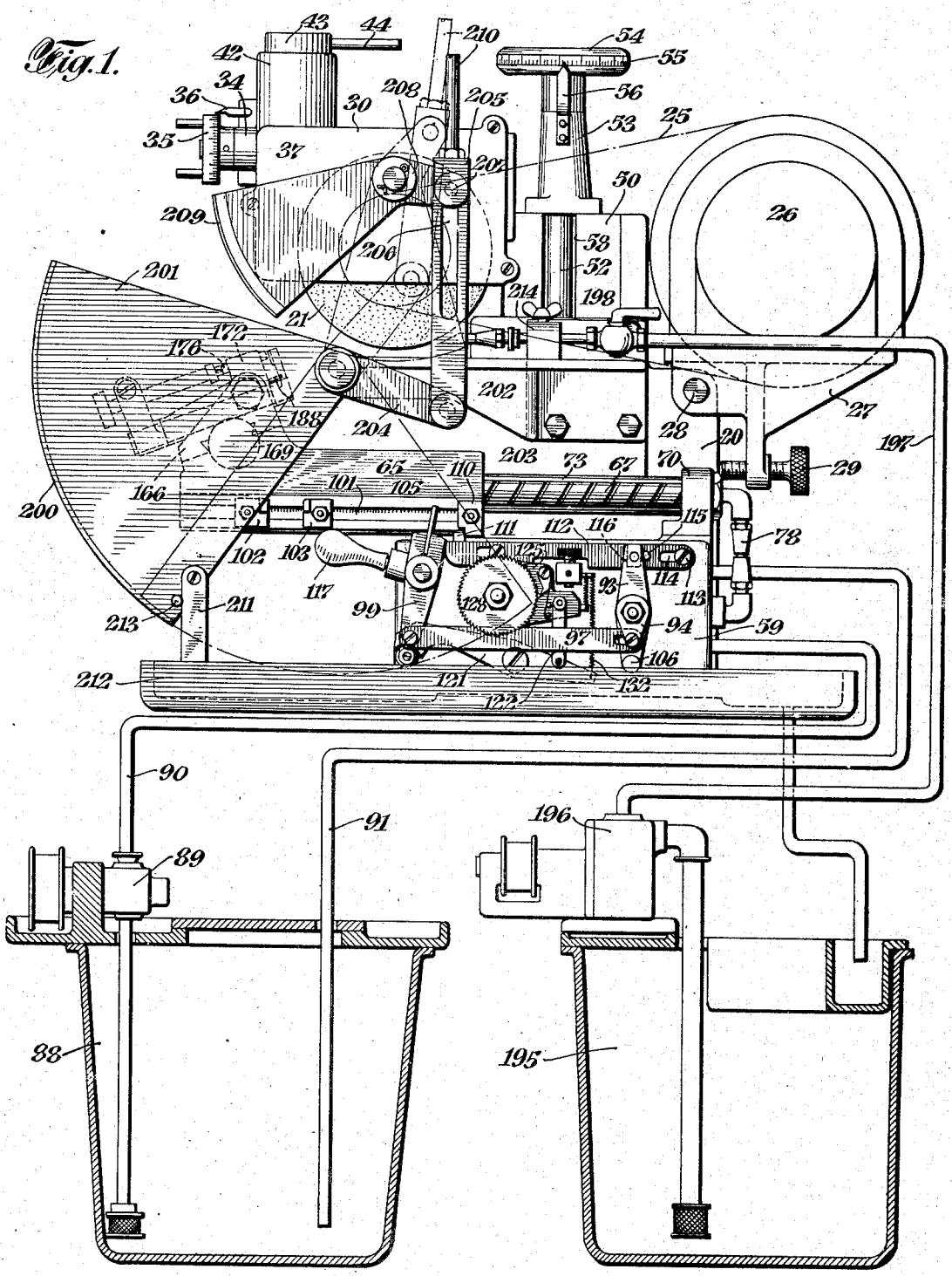

INVENTORS
ALBERT A. HERRICK
EARL R. KOONZ
BY
Edwards Bower Pool
ATTORNEYS

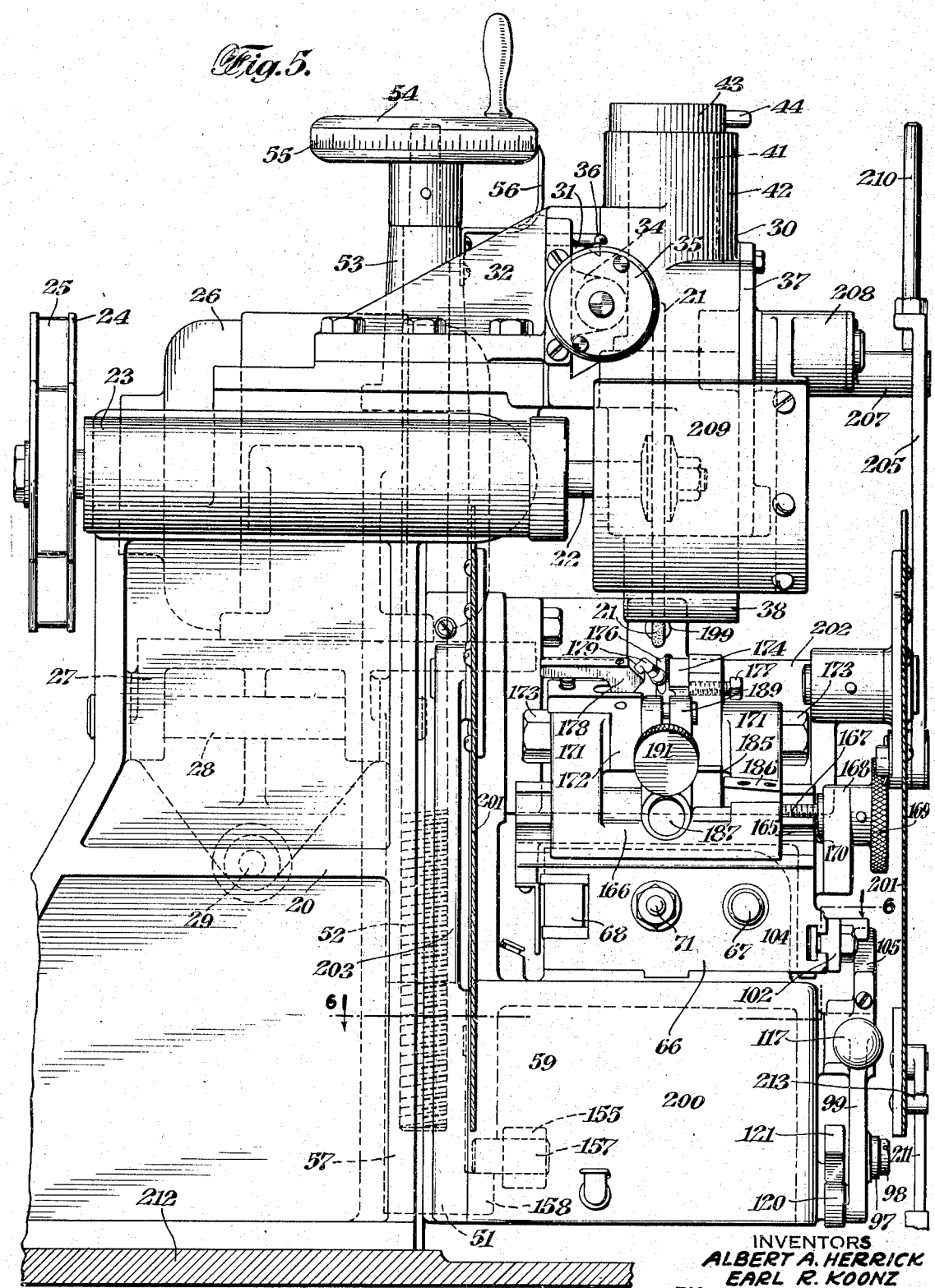

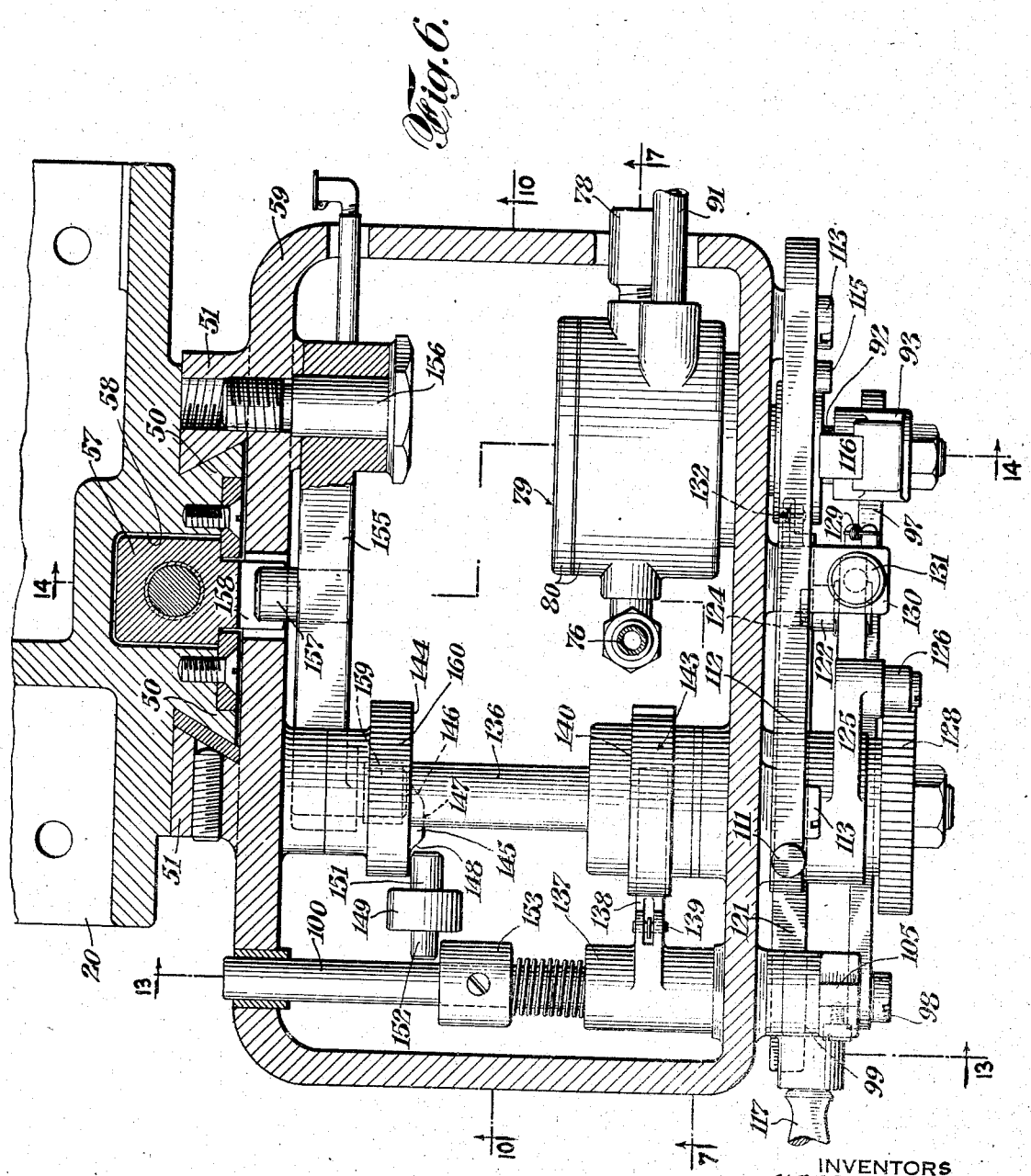

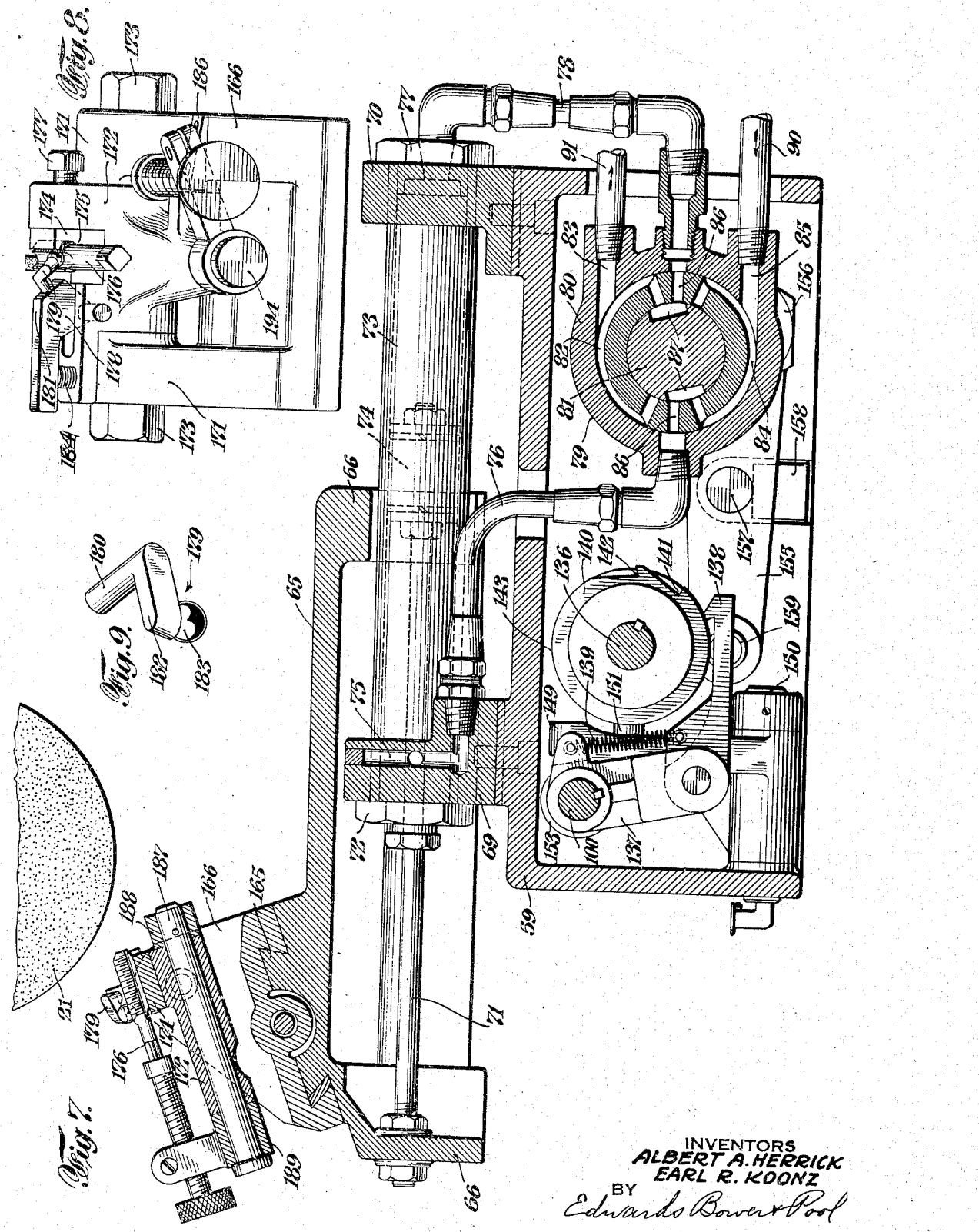

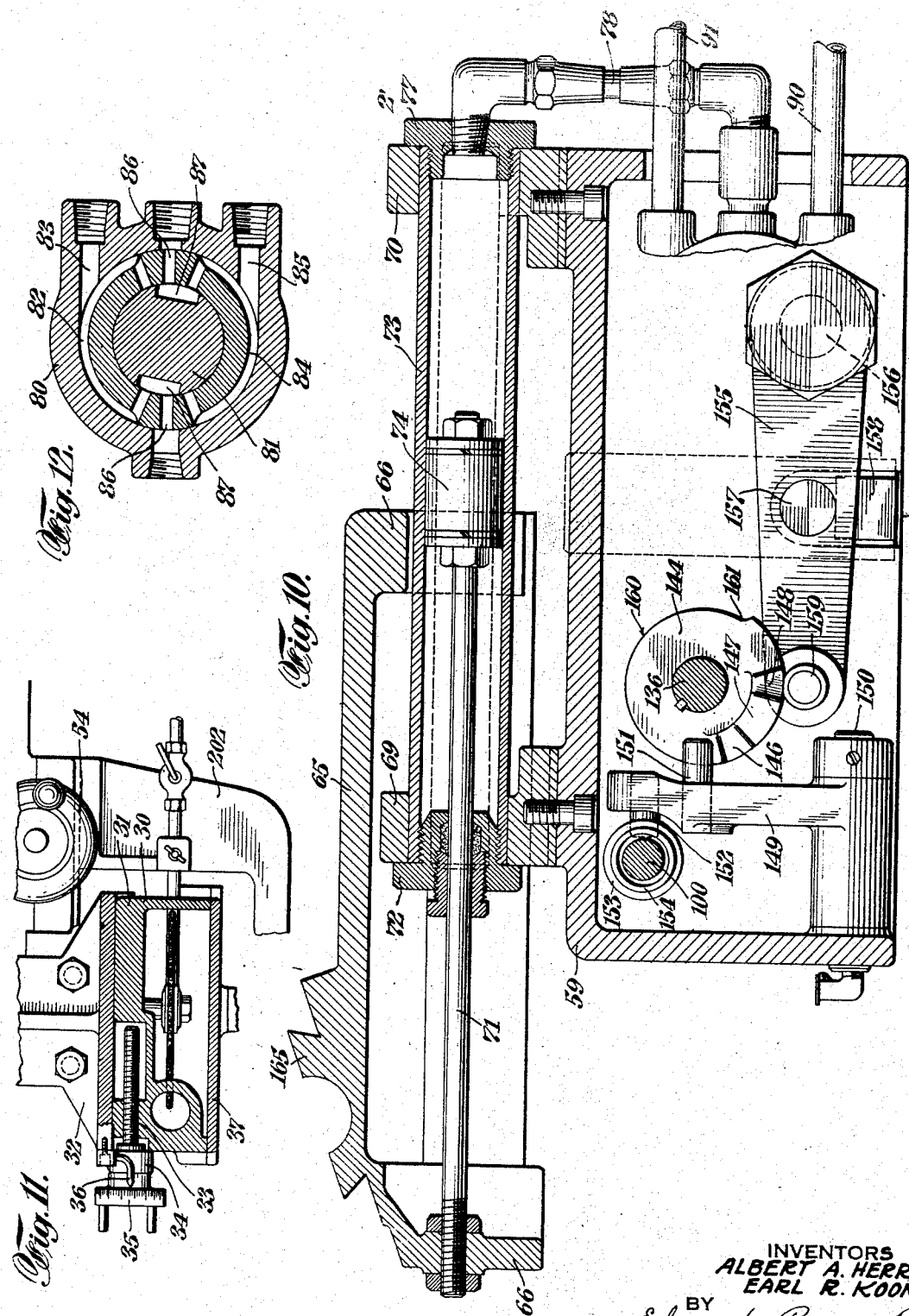

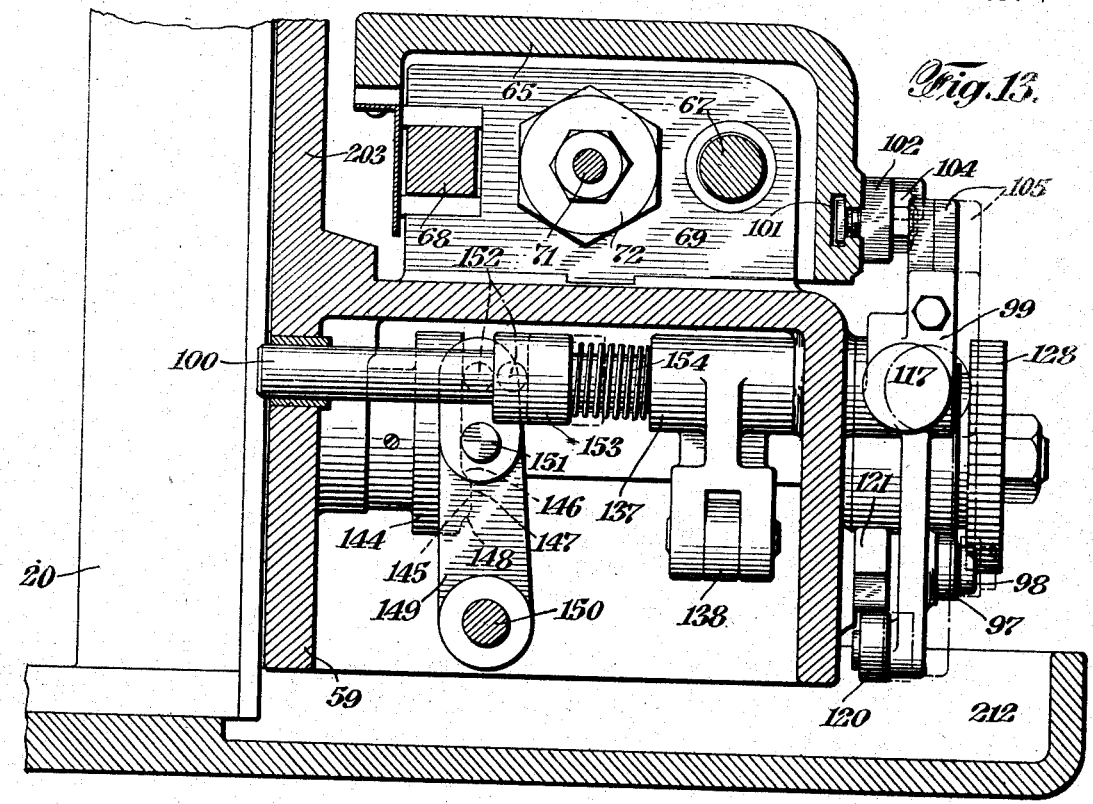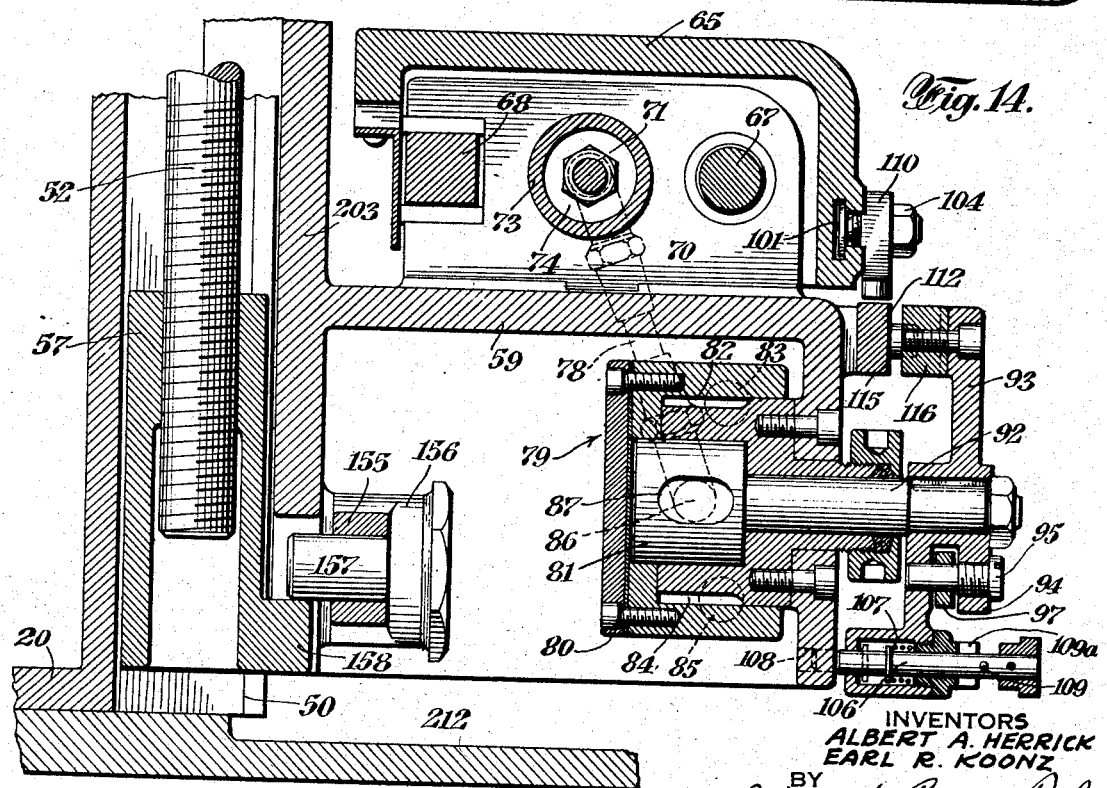

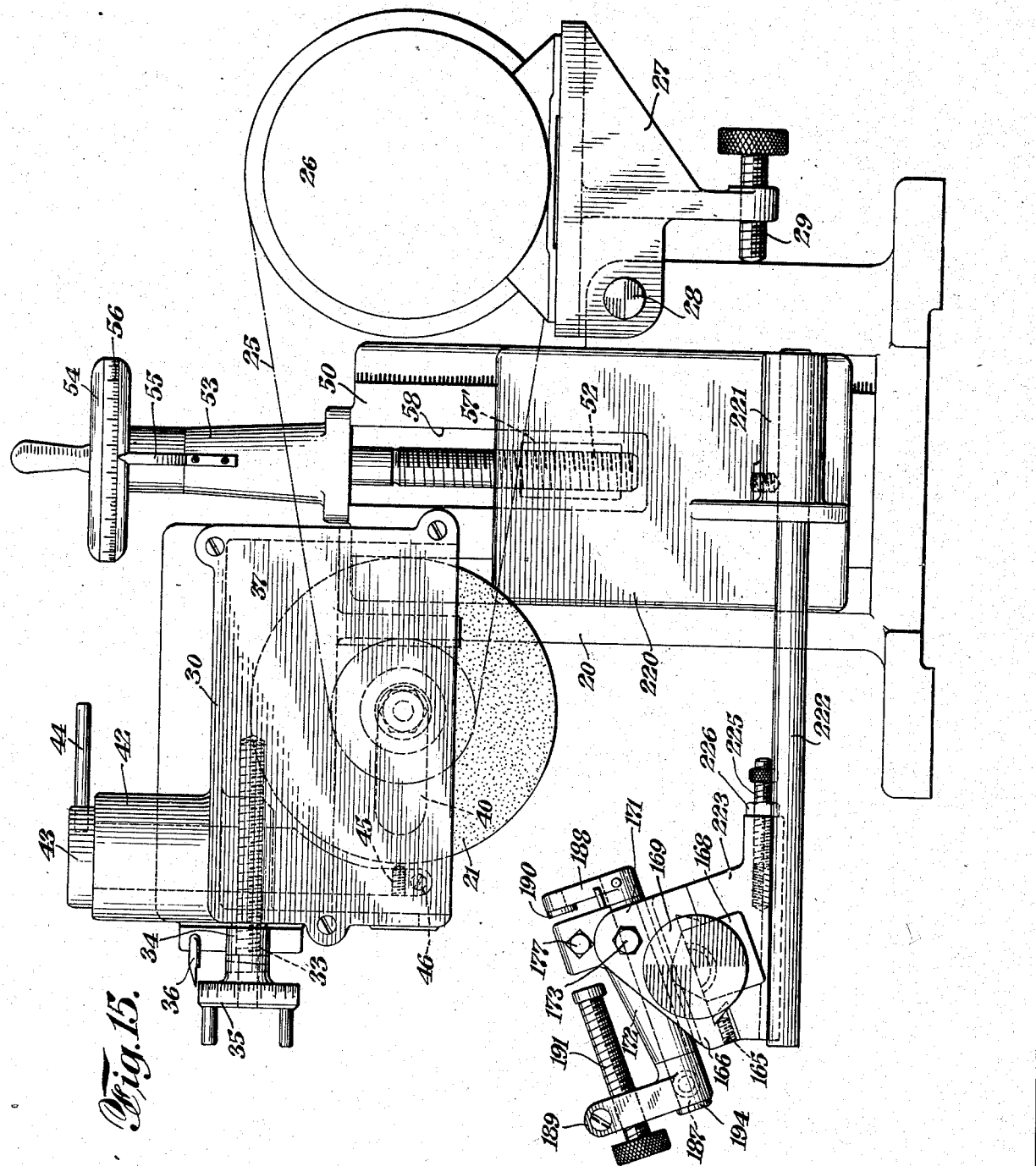

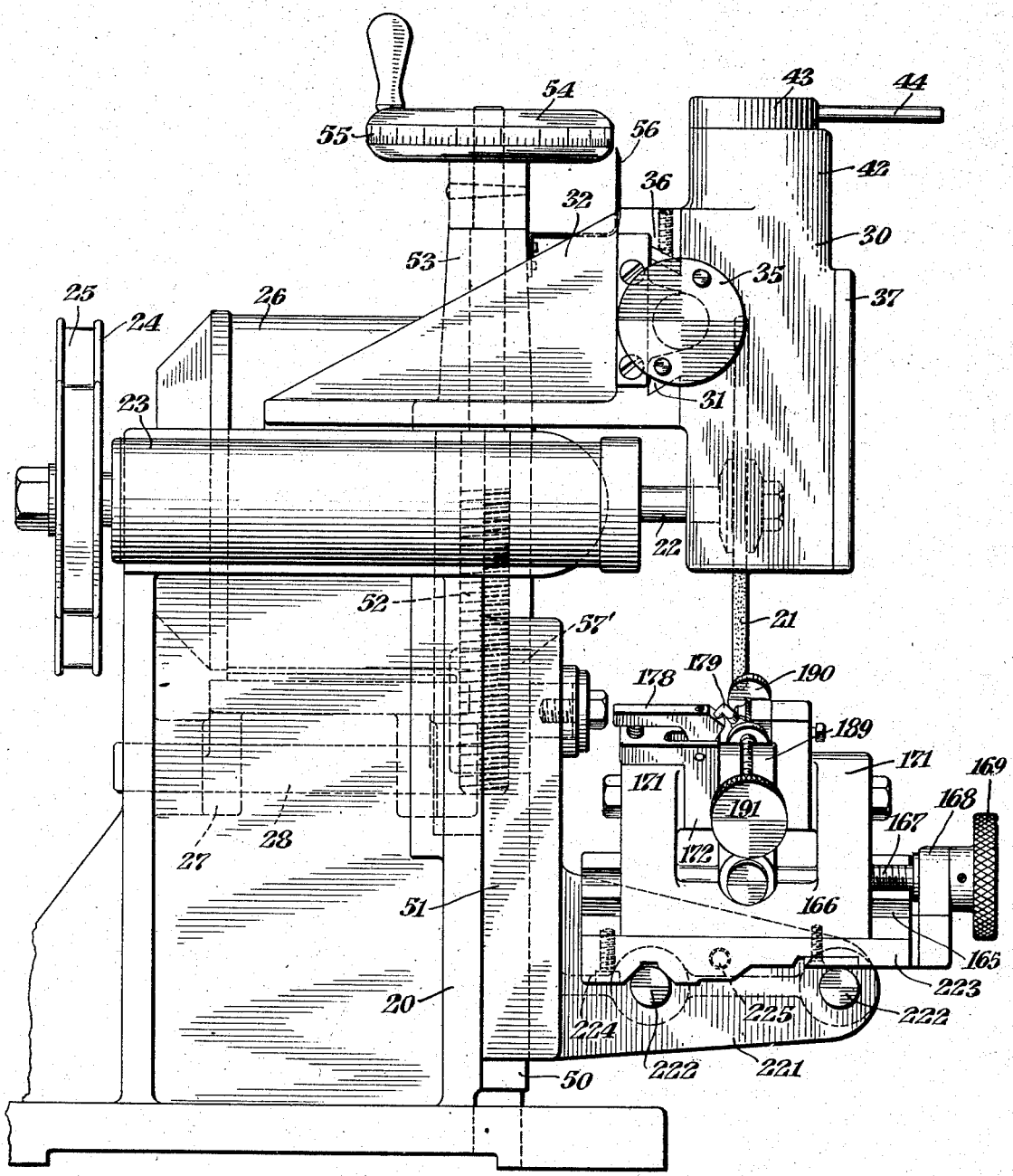

Patented Sept. 30, 1941

2,257,256

UNITED STATES PATENT OFFICE 2,257,256

FLUTE GRINDING APPARATUS

Albert A. Herrick and Earl R. Koonz, Greenfield, Mass., assignors to Greenfield Tap and Die Corporation, Greenfield, Mass., a corporation of Massachusetts Application May 28, 1938, Serial No. 210,563

10 Claims. (Cl. 51—92)

This invention relates to improvements in apparatus of a type adapted for use in grinding auxiliary flutes and the like in thread cutting taps, the auxiliary flutes forming continuations of the standard flutes and extending at an angle thereto toward the entrance end of the tap.

A purpose of the invention is to provide apparatus that will form such auxiliary flutes with a high degree of precision, and adapted for rapid and convenient positioning and removal of taps of different sizes.

The invention is particularly applicable to the generation of auxiliary flutes axially offset from the tap axis, this type being sometimes referred to as gun flutes. A feature of the invention is the provision of apparatus for generating such flutes with precision at a predetermined angle to the tap axis and offset from such axis by a selected distance, as well as to provide means for conveniently altering such angle, offset spacing, or both.

Another object is to provide apparatus of the indicated type in which the auxiliary flute is ground by reciprocation against a grinding wheel having a suitably contoured tap-engaging face; to maintain the desired contour of such face; and to compensate for changes in the diameter of the wheel.

A further feature is the provision of automatically operated tap feeding and reciprocating means, together with means for halting the tap holder in shifted loading position upon completion of grinding and for resuming the grinding operations after loading or resetting.

Other objects and advantages will appear from the following description considered in connection with the accompanying drawings, in which Fig. 1 is a front elevation of the apparatus in loading position showing the fluid pressure and cooling systems;

Fig. 2 is an end view of the entrance portion of a tap showing a gun flute;

Fig. 3 is a side elevation thereof;

Fig. 5 is an end view of said apparatus also in grinding position;

Fig. 6 is a horizontal section on line 6—6 of Fig. 5 with parts broken away, showing the carriage-actuating mechanism in plan;

Fig. 7 is a vertical section on line 7—7 of Fig. 6 showing the carriage and the front portion of the actuating mechanism;

Fig. 8 is a perspective view of the carriage slide and tap holder;

Fig. 9 is a detail of the tap registering finger;

Fig. 10 is a longitudinal vertical section on line 10—10 of Fig. 6 showing the carriage and piston in section and the rear portion of the actuating mechanism;

Fig. 11 is a reduced fragmentary plan of the grinding wheel, truing device and associated parts;

Fig. 12 is a vertical section through the carriage reciprocating valve similar to Fig. 7 but showing the valve in reverse position;

Fig. 13 is a vertical transverse section on line 13—13 of Fig. 6 showing the left-hand portion of the carriage actuating mechanism;

Fig. 14 is a section on line 14—14 of Fig. 6 showing the right-hand portion of the actuating mechanism;

Fig. 15 is a front elevation similar to Fig. 4 showing a hand-operated type of machine; and Fig. 16 is a side elevation of said hand machine.

Figure 4:
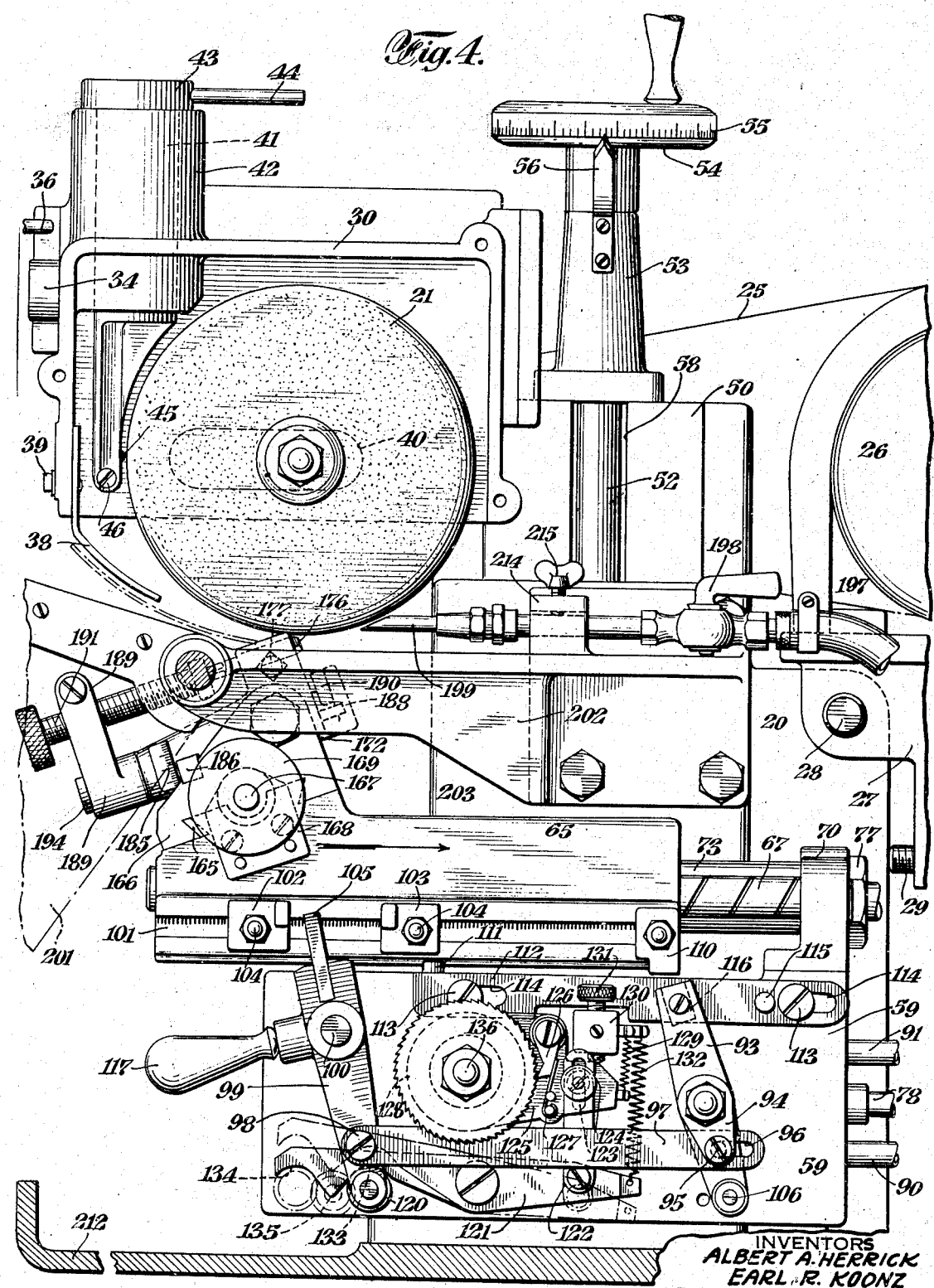
Fig. 4 is an enlarged front elevation of the grinding apparatus shown in Fig. 1, in grinding position.

The apparatus in the form illustrated in Figs. 1 to 14 herein includes in general a stationary grinding wheel; a carriage on which the tap is mounted in position for grinding; an arrangement for reciprocating the tap against the grinding wheel and feeding the tap toward the wheel for a predetermined distance, arranged to halt the reciprocation and shift the carriage to a loading position at the end of the grinding operation; a liquid pressure feed for operating the carriage through a suitable hydraulic valve; an arrangement for circulating a coolant, and suitable shields for protecting the operator and preventing splash.

Referring to Figs. 1, 4 and 5, the apparatus includes a frame 20 supporting a flat disc grinding wheel 21, mounted on a shaft 22 extending through a suitable journal 23 on frame 20 and carrying at its rear end a pulley 24 driven through belt 25 by motor 26 fixed to bracket 27 pivoted at 28 to frame 20 and held in adjusted position by screw 29 bearing against the frame for adjustment of belt tension.

Grinding wheel 21 is surrounded by a housing 30 provided at its rear with a horizontal slide extension 31 mortised into a guideway in bracket 32 mounted on the top of frame 20. As shown in Fig. 11, an adjusting screw 33 threaded into the rear of grinding wheel housing 30, is journaled in ear 34 on bracket 32 and carries index wheel 35 registering with pointer 36 on said bracket. The housing 30 has a removable face plate 37 and is open at the bottom. It may be provided with a splash guard 38 mounted in a vertical slot by screw 39 for suitable adjustment. The wheel shaft passes through a slot 40 in the rear of housing 30 permitting adjustment of the housing.

The periphery of grinding wheel 21 has a semi-circular contour in cross section; and a suitable arrangement is mounted on housing 30 for truing such surface. This arrangement includes a cylindrical body 41 journaled in a suitable hub 42 formed on housing 30 and provided at its upper end with an enlarged head 43 having a handle pin 44 projecting laterally therefrom. The lower end of the body carries a diamond pointed stud 45 adjustably held in position by clamp 46 and arranged with the diamond point spaced from the axis of rotation of body 41 by a distance equal to the radius of transverse curvature of the outer face of wheel 21.

The carriage and operating mechanism are formed as a movable unit mounted on a vertical slide 50 formed on the frame 20 and engaged by suitable mortised guideways 51 on said unit. An arrangement is provided for manual vertical adjustment of the unit, and includes elevator screw 52 journaled in a bearing column 53 mounted on frame 20. A hand wheel 54 is fixed to the upper end of screw 52 and carries a scale 55 cooperating with an indicator 56 on the column 53.

An elevator nut 57 threaded on screw 52 is vertically slidable in channel 58 formed in the slide 50 and supports the housing 59 on which the tap holding carriage and the operating mechanism therefor are mounted.

The carriage unit includes a frame 65 having end skirts 66 slidably engaging front round guide rod 67 and rear square guide rod 68 mounted in cylinder blocks 69 and 70 carried by the housing 59. Piston rod 71 fixed to the left-hand skirt 66 passes through a suitable gland in the head 72 of cylinder 73 mounted at its ends in the blocks 69, 70, and is connected to piston 74 in said cylinder.

Cylinder block 69 is provided with a suitable bore 75 communicating with the end of the cylinder and connected to valve line 76. The opposite end of cylinder 73 is also connected through head 77 and line 78 with valve 79 located in housing 59. The valve comprises a body 80 and a rotary plug 81 fitted therein. The body 80 is provided with a passage 82 communicating at its ends with the plug and connected to the fluid outlet 83. It also has a corresponding lower passage 84 communicating at its ends with plug 81 and connected to the fluid inlet 85. The valve lines 76 and 78 are connected by passages 86 through the body to the plug, each located between the ends of passages 82 and 84. The plug 81 has recesses 87 at opposite sides in register with the adjacent passages 86 and the ends of passages 84 and 82, arranged to overlap and connect each passage 86 with the end of either passage 82 or passage 84 when plug 81 is in right-hand or left-hand position, and to communicate only with passages 86 when the plug is in central position.

The fluid passages 83 and 85 are connected to suitable sources of fluid pressure and discharge. The piston may be operated by oil supplied from a reservoir 88 through pump 89 and feed pipe 90 connected to the inlet 85 of the valve 79, the outlet 83 of the valve being connected through return pipe 91 with the reservoir 88.

Suitable mechanism is provided for oscillating valve plug 81 at suitable intervals to reverse the oil feed connections to cylinder 73 and thereby to reciprocate the carriage frame 65. In the form illustrated the valve plug 81 is provided with a stem 92 (Fig. 14) extending through the front of the housing 59 and carrying valve lever 93. Lever 93 is provided with a fork 94 traversed by a pin 95 extending through slot 96 of valve link 97. The opposite end of link 97 is pivoted on pin 98 carried by control lever 99 (Figs. 4, 13). Sufficient play is provided between link 97 and pins 95, 98 to permit the axial shifting of lever 99 as hereinafter set forth.

Control lever 99 is fixed to the outer end of the control lever shaft 100 journaled for oscillation and longitudinal movement in the front and rear skirts of housing 59. An arrangement is provided for oscillating lever 99 by engagement with suitable abutments on the reciprocating carriage frame 65. In the arrangement illustrated, frame 65 is provided with a T-slot in which drive dogs 102 and 103 are adjustably mounted by suitable bolts 104 having heads fitting in slot 101. The upper end of control lever 99 is provided with a drive blade 105 positioned to engage dogs 102 and 103 during grinding. Means may be provided for locking the parts in inoperative position, such as the lock plunger 106 carried by the lower end of valve lever 93, pressed outwardly by spring 107 into socket 108 in housing 59 arranged to hold lever 93 in vertical neutral position. Plunger 106 is held in retracted position during operation as by cross pin 109 which may by rotation be located either in slot 109a or on the side walls of the slot.

Means is provided for shifting the carriage frame 65 to loading position at the left and for halting the reciprocation of the carriage when said frame is in loading position. In the drawings this includes a stop dog 110 adjustably mounted in slot 101 and positioned to engage a stud 111 on stop slide 112 mounted on studs 113 on housing 59 passing through slots 114 in slide 112 to permit horizontal shifting of the slide. A valve shifting stud 115 on slide 112 is positioned to engage a stop lug 116 on the upper end of valve lever 93 arranged to shift the valve into neutral position, with recesses 87 in register only with passages 86, when slide 112 is fully shifted to the left, the positioning of valve lever 93 operating through link 97 to move control lever 99 likewise to central approximately vertical position. An arrangement is provided for limiting the period of reciprocation of the carriage, operative at the end of the predetermined number of reciprocations to shift control lever 99 outwardly by axial movement of its shaft 100, so that the control lever blade 105 will clear the shorter dog 103 during the movement of the carriage to the left. For this purpose the control lever 99 is provided at its lower end with a roller 120 (Figs. 4 and 5) engaging the lower cam face of ratchet lever 121 pivoted on the housing 59. Ratchet link 122 pivoted to lever 121 has a slot 123 engaging stud 124 on ratchet arm 125 carrying pawl 126 pressed by spring 127 into engagement with ratchet 128. Ratchet arm 125 is biased upwardly by spring 129 connected to block 130 mounted on the housing 59 and carrying a stop screw 131 engaging the upper face of arm 125 to regulate the throw of the pawl. Ratchet lever 121 is also biased upwardly by spring 132 connected to block 130.

The lower face of ratchet lever 121 engaging roller 120 is provided with depressions 133 and 134 engaging roller 120 when control lever 99 is in right and left hand positions, and an intermediate elevation 135 engaging roller 120 to depress pawl 126.

Ratchet 128, which preferably is provided with a large number of relatively fine teeth to permit a wide range of adjustment of the throw, is mounted on ratchet shaft 136 journaled in the front and the rear of housing 59; and ratchet arm 125 may conveniently be journaled on shaft 136. Shaft 136 and control lever shaft 100 carry mechanism for shifting the control lever shaft 100 axially to arrest the reciprocation of the carriage. For this purpose a pawl arm 137 fixed on shaft 100 within housing 59 carries a pawl 138 (Figs. 7 and 13) biased upwardly by spring 139 and engaging a partial ratchet 140 fixed to shaft 136. Ratchet 140 is provided with two teeth 141 and 142 having a relatively wide spacing, the face 143 of ratchet 140 beyond these teeth being smooth. Also fixed to shaft 136 is the cam disc 144 provided with a face cam 145 (Figs. 6 and 10) having an inclined approach face 146, a central elevated face 147 and an inclined return face 148. Shift lever 149 mounted on pivot 150 carried by housing 59 is provided with a cam pin 151 positioned to engage cam 145 and a shifting pin 152 engaging collar 153 fixed to control lever shaft 100 and normally biased rearwardly by spring 154 bearing against the hub of ratchet arm 137.

An arrangement is provided for progressively shifting the carriage upwardly toward the grinding wheel 21 during grinding. In the form illustrated, this arrangement shifts the entire operating mechanism carried by housing 59, and provides an automatic vertical feed in combination with the manual vertical feed through operation of hand wheel 54. This arrangement includes a feed lever 155 (Figs. 6 and 10) pivoted on stud 156 on the housing 59 and provided with a fulcrum stud 157 bearing against a lug 158 on elevator nut 57. The opposite end of lever 155 carries a pin 159 bearing against the outer face 160 of cam disc 144 which has a helical contour arranged to force pin 159 downwardly as the ratchet shaft 136 is revolved, thereby lifting the housing 59 and the entire operating mechanism carried thereby. The ends of the helical face 160 are connected by a step 161 for dropping the housing 59 and associated parts to starting position.

A suitable mounting arrangement for supporting and adjusting the tap is carried by carriage frame 65. The frame is provided near its left end with a carriage mounting (Figs. 4, 5 and 7) including a transverse slide 165 mortised into a guideway in carriage 166. An adjusting screw 167 (Fig. 5) is threaded in the carriage 166 and passes through retaining plate 168, being held against longitudinal movement by the hub of knob 169 and collar 170 on screw 167 bearing against opposite sides of plate 168.

Carriage 166 includes flanges 171 between which the mounting frame 172 is clamped by aligned screws 173. The frame 172 is recessed at the top to receive an interchangeable tap cradle block 174 having a bore 175 fitting a tap 176 of a given diameter. The block 174 shown in the drawings is particularly adapted for gun flute grinding, and is cut away from top center through about 90 degrees to the left, being held in place by clamping screw 177.

An arrangement is provided for locating and holding the tap accurately in the desired rotated position, and is particularly advantageous when grinding gun flutes, being adapted to locate the standard flutes in accurate registration with the flute that is ground by the wheel 21. For this purpose an indexing rocker arm 178 pivoted in frame 172 is provided with an indexing finger 179 (Fig. 9) having a shank 180 adjustably held in a socket in arm 178 by set screw 181 and provided with an offset arm 182 carrying a ball tip 183. The radius of tip 183 is preferably slightly greater than that of the standard flute 192 of the tap that is being ground, so that the tip engages symmetrically the opposite edges of the flute. Rocker arm 178 and finger 179 are biased toward the tap by a spring 184 between the rear end of the arm and the top of frame 172 with sufficient force to clamp the tap in block 174.

An arrangement is provided for adjusting the frame 172 about its axis to provide a selected angular relation between the axis of the tap and that of the gun flute 193 being ground therein. The adjustment may be made by loosening screws 173, rotating the frame 172 and then tightening said screws. An index 185 (Fig. 4) may be provided at the front of frame 172 in register with an index plate 186 mounted on the front flange 171.

Frame 172 is provided with means for positioning the front end of a tap 176 located in cradle block 174 in fixed longitudinal position so that flutes ground by wheel 21 may extend an equal distance along the tap. For this purpose a pivot rod 187 rotatably mounted in a longitudinal bore in carriage 166 beneath the position of tap 176 therein carries front registering arm 188 and rear registering arm 189. Arm 188, fixed to the front end of rod 187, carries a locater plate 190 in alignment with tap 176 when arm 188 is in upper position. Rear arm 189, rotatable on rod 187 and held against carriage 166 by head 194, is provided with a registering screw 191 threaded through the arm in position to engage the rear end of tap 176.

An arrangement is provided for supplying a suitable liquid to the face of the grinding wheel. This may include a reservoir 195 from which the coolant is forced by pump 196 through line 197 and cock 198 to spout 199 located in position to supply wheel 21 with the liquid in the grinding zone.

The apparatus should be provided with suitable guards to prevent injury to workmen and to eliminate splashing of the cooling liquid. In the form illustrated in Figs. 1, 4 and 5 the construction includes an arcuate lower guard 200 having side plates 201 pivoted to the ends of a forked bracket 202 mounted on a face plate 203 extending upwardly from housing 59. Bracket 202 is provided with a boss 214 in which the coolant line to spout 199 is adjustably clamped by set screw 215. The forward plate 201 is provided with an extension arm 204 pivoted to link 205 having a slot 206 receiving a pin 207 on arm 208 pivoted on face plate 37 of housing 30 and carrying an arcuate guard 209. The upper end of link 205 is provided with a threaded adjusting rod 210 extending into slot 206 and engaging pin 207. The guards are held in operating position by a latch bar or foot 211 arranged to rest on the edge of pan 212 when swung against positioning pin 213 on side plate 201.

The hand-operated machine shown in Figs. 15 and 16 includes the same general arrangement of grinding wheel and carriage, but is arranged for manual reciprocation of the carriage beneath the wheel. In this arrangement the elevator screw 52 is provided with an elevator nut 57' bolted to a vertical slide frame 220 having a rear guideway in mortised engagement with the vertical slide 50. A bracket 221 on frame 220 carries parallel slide rods 222. Carriage frame 223 is slidably mounted on rods 222, the forward rod passing through a suitable bore in frame 223 while a grooved slide plate 224 adjustably bolted to the bottom of frame 223 rests on the rear slide rod 222. Frame 223 is provided with flanges 171, a cross slide 165 and associated parts, including the carriage and tap mounting, corresponding to those which have already been set forth in detail. An adjustable stop screw 225 threaded in the forward face of frame 223 and held in adjusted position by lock nut 226 is positioned to engage bracket 221 and limit the forward movement of the carriage during grinding.

In the operation of the automatic arrangement shown in Figs. 1–14, and starting with the parts in loading position, the guard latch bar 211 is shifted away from pan 212 permitting the lower guard 200 to swing beneath the carriage, the resultant shifting of link 205 permitting the upper guard 209 to swing downwardly beneath wheel 21 to protect the operator's fingers. A tap 176 is inserted in a block 174 fitting the tap and clamped in frame 172 by screw 177, the registering arms 188 and 189 are swung upwardly into alignment with the tap, and registering screw 191 is rotated until the front of the tap is positioned against locator plate 190. An indexing finger 179 having a tip 183 of proper size to engage the flutes in tap 176 is mounted in rocker arm 178 and tap 176 is rotated until tip 183 registers accurately in the flute whose continuation is to be ground. Arm 188 is swung out of the grinding path, arm 189 remaining frictionally held in vertical position to back up the shank end of the tap during grinding. The carriage 166 may be transversely adjusted by manipulating adjusting screw 167 to position the flute accurately at the proper offset distance from the tap axis.

Wheel 21 may be trued by rotating index wheel 35 until the diamond point on stud 45 engages the wheel. Oscillation of the body 41 of the truing device by oscillating handle pin 44 through a semi-circle while wheel 21 is rotating will provide an accurate semi-circular surface on the grinding wheel 21. The index on wheel 35 may be calibrated with the scale 55 on elevator hand wheel 54, as said index indicates the diameter of grinding wheel 21 and the scale 55 indicates the elevation of the carriage and associated parts which must correspond to the wheel diameter in order to bring the tap into grinding position.

The carriage and associated parts are in loading position, with stop dog 110 against stud 111 and valve lever 93 in central vertical position. Control lever 99 is slightly to the left of vertical position with roller 120 on the slope between depression 134 and elevation 135, and is also in outwardly shifted position as indicated in dotted lines on Fig. 13. Guards 200 and 209 are shifted into running position as shown in Fig. 1 and held by foot 211. Control lever 99 is shifted counter-clockwise by depressing handle 117 on said lever, thereby shifting valve lever 93 through the action of link 97 in similar manner, admitting oil under pressure to the left of piston 74. The carriage and frame 65 move to the right, the shorter dog 103 passing drive blade 105 on control lever 99. Dog 102 then engages blade 105 and rocks control lever 99 to the right, throwing valve lever 93 in the same direction and reversing the valve 79.

Pawl 138 on the control lever shaft 100 is in engagement with tooth 142 of the partial ratchet 140 when the carriage is in loading position; and the initial shift of lever 99 retracts pawl 138, rotating the ratchet shaft 136 a sufficient distance to carry cam pin 151 rearwardly over cam face 148, permitting shift lever 149 and control lever shaft 100 to shift rearwardly under the action of spring 154. The shift of shaft 100 will bring the drive blade 105 into alignment with the short dog 103, so that when the carriage is reversed dog 103 will rotate control lever 99 counter-clockwise, reversing the valve.

At the same time the oscillation of lever 99 rocks ratchet arm 125 at each stroke, rotating rachet shaft 136 and gradually forcing downwardly the pin 159 on lever 155, thereby raising the housing 59, the carriage structure and the tap toward the grinding wheel 21. The pawl 138 is inoperative during grinding since it rides on the unbroken outer face 143 of disc 140. The reciprocation of the tap against the grinding wheel 21 continues with gradual feed of the tap toward the wheel; and it is noted that the total depth of cut can be accurately determined by correlating the total feed distance caused by the action of cam face 160 with the initial spacing of the tap from grinding wheel 21 which may be regulated by manipulation of hand wheel 54.

The reciprocation of the carriage and the feed of the tap are continued for a number of strokes determined by the throw of pawl 126 controlled by the setting of stop screw 131. The grinding is terminated when ratchet disc 140 has rotated to the point where pawl 138 engages tooth 141. At this point cam pin 151 is approaching cam face 146. The next clockwise movement of control lever 99 will rotate ratchet shaft 136 through the action of pawl 138 for a distance sufficient to bring cam pin 151 on to the central elevated face 147 of cam 145, rocking the shift lever 149 and forcing the control lever shaft 100 and lever 99 in a forward direction until the drive blade 105 will clear short dog 103. These operations take place as the result of a clockwise shift of control lever 99, which sets the valve 79 in position to shift the carriage frame 65 and associated parts toward the left. This action is continued until stop dog 110 contacts stud 111, moving stop slide 112 to the left, the engagement of shifting stud 115 with lug 116 serving to move valve lever 93 into neutral position and moving control lever 99 into similar position through link 97. The carriage is now at the extreme left position shown in Fig. 1, substantially spaced from the grinding wheel 21 and ready for resetting or replacement of the tap when the guards have been shifted in the manner already set forth.

The operation of the hand machine shown in Figs. 15 and 16 involves the same general manipulation in inserting and registering the tap. During grinding carriage 223 is reciprocated along slide rods 222 by hand, and is fed toward the wheel 21 by rotating hand wheel 54.

The described arrangement includes features that are particularly advantageous in grinding gun flutes in taps with accuracy, speed and convenience; but it will be apparent that certain features are suitable for use in other operations and the invention is not restricted to the specific purpose disclosed except as limited by the claims.

We claim:

1. Tap flute grinding apparatus including a grinding wheel, a tap holder, means for imparting relative movement between the wheel and the holder defining a flute grinding path, means for mounting a fluted tap in the holder with the entrance end of the tap extending into the grinding path at an angle, and means on the holder fitting into a tap flute and securely held in contact with opposite edges of the flute for maintaining the flute circumferentially in register relative to the grinding path.

2. Tap flute grinding apparatus including a grinding wheel, a tap holder, means for imparting relative movement between the wheel and the holder defining a flute grinding path, means for mounting a tap in the holder including a tap socket and a tap positioning unit mounted on the holder including a stop member in alignment with the entrance end of the tap and means engaging the rear end of the tap for shifting the tap into contact with the stop member, the stop unit being movable out of alignment with the tap during grinding.

3. Grinding apparatus including a grinding wheel, a work holder, a support, means carried by the support for reciprocating the work holder on the support in grinding relation to the wheel, and means on the support for automatically feeding the work holder toward the wheel, said means including a stationary external bearing, a lever engaging the support and fulcrumed on the bearing, and cam means on the support rotated by the drive means for shifting the lever about the fulcrum.

4. Grinding apparatus including a grinding wheel and a feed unit including a support, a work holder, drive means for reciprocating the work holder on the support in grinding relation to the wheel, ratchet means actuated by the drive means, means for feeding the work holder in the plane of the grinding wheel actuated by the ratchet means, drive control means, and cam means for shifting the control means out of normal operating position actuated by the ratchet means.

5. Tap flute grinding apparatus including a grinding wheel, a support moving parallel to the plane of the wheel and carrying a work support moving at right angles to the direction of movement of said first mentioned support and in the plane of the grinding wheel, a work holder carried by said work support and tap holding means on said work holder adapted to position a tap in the plane of said grinding wheel, manual means for setting the position of said first mentioned support with relation to said wheel, automatic means for producing relative reciprocation between said grinding wheel and said work support, automatic means for moving said first support step by step toward said grinding wheel, and means for automatically terminating said step by step movement after a predetermined number of operations.

6. Tap flute grinding apparatus as set forth in claim 5 in which the work holder is angularly adjustable on the work support so as to position the tap at an angle to the tangent at the point of contact with the wheel.

7. Tap flute grinding apparatus including a grinding wheel rotating in a vertical plane, a stationary frame, a main housing support vertically adjustable on said frame toward and away from said grinding wheel, a carriage frame horizontally reciprocable on said main housing support parallel to the plane of said grinding wheel, a work holder carried by said carriage frame and transversely adjustable by a movement in a plane at right angles to the plane of said grinding wheel to position the tap carried by said holder longitudinally in contact with said wheel, means carried by said main housing support substantially in the plane of the grinding wheel for reciprocating said carriage frame and moving the tap back and forth with its flute in contact with the periphery of the grinding wheel, and means for automatically moving said main housing support vertically by the reciprocating movement of said carriage frame so as progressively to feed the tap against the grinding wheel.

8. Tap flute grinding apparatus as set forth in claim 7 in which the reciprocating means for the carriage frame is hydraulically operated and comprises a mechanical control actuated from the carriage frame and connected to operate the means for moving the main housing support vertically.

9. In apparatus for grinding tap flutes, the combination with a grinding wheel of a carriage adapted to support the tap in grinding position and reciprocable in the plane of the grinding wheel, means for reciprocating said carriage comprising a control lever, opposing stops on said carriage for engaging said lever to move it in opposite directions, a third stop on said carriage acting to move said lever to an intermediate neutral position corresponding to the inoperative condition of said reciprocating means, cam means for moving said lever out of the path of one of said opposing stops while maintaining its actuation by said third stop, and means for operating said cam by the reciprocating movements of said control lever so that at the end of a number of reciprocations the actuation of the control lever will be transferred to said third stop returning the lever to said neutral position.

10. Tap flute grinding apparatus as set forth in claim 9 in which the carriage is also vertically movable and the cam means for shifting the operating head also progressively moves the carriage vertically during its reciprocations so as to feed the tap against the grinding wheel.

EARL R. KOONZ.
ALBERT A. HERRICK.